(12) United States Patent
Sandström

(10) Patent No.: US 12,132,942 B2
(45) Date of Patent: Oct. 29, 2024

(54) COMMUNICATION METHOD AND SYSTEM

(71) Applicant: XMReality AB (publ), Linköping (SE)

(72) Inventor: Alexander Sandström, Linköping (SE)

(73) Assignee: XMReality AB (publ), Linköping (SE)

( * ) Notice: Subject to any disclaimer, the term of this patent is extended or adjusted under 35 U.S.C. 154(b) by 166 days.

(21) Appl. No.: 18/168,214

(22) Filed: Feb. 13, 2023

(65) Prior Publication Data

US 2024/0276036 A1    Aug. 15, 2024

(51) Int. Cl.
  *H04N 21/2343* (2011.01)
  *H04N 21/437* (2011.01)
  *H04N 21/6437* (2011.01)
  *H04N 21/6587* (2011.01)

(52) U.S. Cl.
  CPC ..... *H04N 21/23439* (2013.01); *H04N 21/437* (2013.01); *H04N 21/6437* (2013.01); *H04N 21/6587* (2013.01)

(58) Field of Classification Search
  CPC ........... H04N 21/23439; H04N 21/437; H04N 21/6437; H04N 21/6587
  See application file for complete search history.

(56) References Cited

U.S. PATENT DOCUMENTS

| | | | |
|---|---|---|---|
| 11,263,818 B2 * | 3/2022 | Shreve | G06T 19/006 |
| 2018/0275848 A1 * | 9/2018 | Tuukkanen | G06F 3/0484 |
| 2019/0370544 A1 * | 12/2019 | Wright, Jr. | G06T 7/20 |
| 2020/0143593 A1 * | 5/2020 | Rudman | G06T 19/006 |
| 2020/0175765 A1 * | 6/2020 | McAdam | G06F 16/29 |
| 2020/0195518 A1 * | 6/2020 | Sugaya | G16Y 40/35 |
| 2020/0334877 A1 * | 10/2020 | Pokorny | G06F 3/147 |

* cited by examiner

*Primary Examiner* — Oschta I Montoya
(74) *Attorney, Agent, or Firm* — Getech Law LLC; Jun Ye

(57) ABSTRACT

A communication method between a plurality of endpoints, the method comprising: the first endpoint (1) sending a video stream acquired by the imaging device (11) to a second endpoint (2) for video communication, by using a first communication channel (101); any of the plurality of endpoints initiating a request for requesting the first endpoint (1) to send a still image to the second endpoint (2); the first endpoint (1) respectively generating a first and a second version of the image, and sending the same to the second endpoint (2); and the second endpoint (2) receiving the first version of the image prior to receiving the second version of the image. The first and second versions of the image depict one or more same objects.

19 Claims, 4 Drawing Sheets

COMMUNICATION METHOD AND SYSTEM

TECHNICAL FIELD

The present document relates to a communication method and system. In particular, it relates to a communication method and system for real-time communication between a plurality of participants.

BACKGROUND

Video communication is a multipoint reception and transmission of audio and video signals between at least two participants in different locations.

Video communication has been widely used as it is not only cost effective, but also can mitigate the difficulties caused by travelling, and other constraints, such that the plurality of participants not being in the same location may hear and see each other, or share a common visual view, as if they were in the same location. The video communication is typically real-time communication (RTC).

Each of the plurality of participants may have an individual device, such as a laptop or a smartphone comprising a camera, a microphone, a loudspeaker, and a display.

The need to improve collaboration between the participants in different locations has driven further developments of real-time video communication. For example, using real-time video communication, it is possible to share what one participant is looking at in real-time, e.g., a physical object or environment, with other participants in one or many different locations, such that they can see that same object or environment, as if they were at the same location. Based on this need, remote expert guidance solutions, also known as remote visual assistance solutions, have been developed.

The purpose of remote expert guidance solutions is to help a user solve a problem and/or perform a task in real-time that requires assistance and/or guidance from one or more remote experts. Typically, a device of the user on site acquires live video and sends it to the remote expert in real-time, to provide content and information regarding the problem to be solved and/or the task to be performed.

The remote expert may provide specific instructions and guidance to the user, e.g., in a form of written instructions or verbal instructions, based on the received video stream. Since the video stream comprises moving objects, sometimes a still image is desirable, for example to focus on specific details, such as a physical object. It may be easier to mark (e.g., by pointing, drawing or annotating) on a still image to provide guidance than a video of moving objects. A user may pause the live video stream for obtaining the still image.

One user may share a still image, such as a diagram sketch, for providing instructions and guidance to help one or more remote users to solve a problem and/or perform a task.

A RTC system can be used to realize such remote expert guidance solutions. The RTC system normally comprises communication software protocols and communication hardware media for implementing real-time communications.

However, the RTC software protocols are typically designed for networks with limited capacity or with best effort delivery, such as the Internet. Thus, the live video stream may be compressed to a reduced amount of data for transferring to adapt in real-time to the actual available network capacity. Typically, RTC video compression is lossy. That is, the compression will reduce the quality of the video to achieve a reduced amount of data and therefore fewer details are visible in the compressed video. On a typical low bandwidth network (e.g., 3G cellular network) and in environments with poor network conditions (e.g., in a basement), the quality of a live video feed may be poor such that the visuals are blurry and/or pixelated. Without clear visuals, it may be difficult or even impossible to provide remote expert guidance.

Similarly, a still image, comprising instructions and guidance in the form of e.g., a diagram, drawing or sketch, may be compressed to a reduced amount of data for transferring to adapt in real-time to the actual available network capacity. That is, the compression will reduce the quality of the image being sent, resulting in fewer details being visible in the compressed image. On a typical low bandwidth networks and in environments with poor network conditions, the quality of a transferred image may be poor such that the visuals are blurry and/or pixelated. Thus, it may be difficult or even impossible to receive remote expert guidance. Alternatively, a still image, comprising instructions and guidance in the form of e.g., a diagram, drawing or sketch, may be sent with high quality irrespective of the available network capacity, resulting in a long waiting time before it can be received by the other participant(s), and therefore postponing the start of collaboration between the participants.

Thus, there is a need to provide an improved communication method and system.

SUMMARY

It is an object of the present disclosure, to provide a new communication method between a plurality of endpoints and a communication system comprising a plurality of endpoints, which eliminates or alleviates at least some of the disadvantages of the prior art.

The invention is defined by the appended independent claims. Embodiments are set forth in the appended dependent claims, and in the following description and drawings.

According to a first aspect, a communication method is provided between a plurality of endpoints, wherein a first endpoint comprises an imaging device, the method comprising:
  the first endpoint sending a video stream acquired by the imaging device to a second endpoint of the plurality of endpoints for video communication, by using a first communication channel between the first and second endpoints;
  any of the plurality of endpoints initiating a request for requesting the first endpoint to send an image to the second endpoint, wherein the image is a still image;
  the first endpoint respectively generating a first version of the image and a second version of the image;
  wherein the first and second versions of the image depict one or more same object(s);
  wherein at least one property of the first version of the image is different from said at least one property of the second version of the image, such that a quality of the first version of the image is lower than a quality of the second version of the image;
  the first endpoint respectively sending the first and second versions of the image to the second endpoint; and
  the second endpoint receiving the first version of the image prior to receiving the second version of the image.

The at least one property may comprise any of: compression grade, compression method, file size, resolution, number of pixels, number of colors, of an image.

The inventive concept is to deliver a low quality version of an image, and to deliver a high quality version of the same image in parallel, during a real-time communication between two or more participants over any type of network, such that a user can start working with the low quality version, until the high quality version is received. The user could use the time, which otherwise would be wasted on waiting for receiving the high-quality version, to start working with the low quality version which would be received in a shorter time. When the high quality version is received, the high quality version may replace the low quality version automatically, such that the user may seamlessly continuing working on the high quality version. The low quality version of the image may be a paused frame of the live video stream of the real-time communication. The high quality version of the image may be a version of the image depicting the same object(s) as the low quality version, but with more details. The user experience may be largely improved, especially when network conditions are poor.

The method can achieve a quick pause of a live video stream between two endpoints. The low quality version of the image may be the last frame of the live video stream, meaning the user may perceive the pause as almost instant. When the high quality version of the image is received, the user may perceive that the quality of the paused video stream is improved.

The method can be used to transfer still images which are not acquired by a camera. For example, the still images may be images rendered from an electronic file (e.g., texts, diagrams or drawings) locally stored in one endpoint. The still images may be images converted from a local electronic file of another format, e.g., a Word file or a PDF file. The still images may comprise instructions and/or guidance to a user of another endpoint.

Since the low quality version of the image may be received very fast, e.g., 100 ms, or 10 ms, the remote participant may almost immediately start working with the low quality version of the image instead of waiting for the high quality version of the image. This may shorten the unnecessary waiting time. Thus, it may improve efficiency and provide a better user experience.

Since the high quality version of the image can be received later and then automatically replace the previously received low quality version of the image, the remote participant may be provided with details which do not exist in the low quality version of the image. This ensures that the quality of the cooperation between the participants is not degraded in scenarios where the network capacity is limited, or in use cases where a really high quality image is needed.

The step of the first endpoint respectively generating a first version of the image and a second version of the image may comprise in response to the request, the imaging device acquiring an image and the first endpoint respectively generating the first and second versions of the image based on the acquired image.

The step of the imaging device acquiring an image may comprise the imaging device acquiring the image by using a focal length being different from a focal length used for acquiring the video stream.

The step of the first endpoint respectively generating a first version of the image and a second version of the image may comprise in response to the request, the first endpoint generating the first and second versions of the image based on an electronic file.

The step of the first endpoint respectively sending the first and second versions of the image to the second endpoint may comprise the first endpoint sending the first version of the image by using the first communication channel.

The step of the first endpoint respectively sending the first and second versions of the image to the second endpoint may comprise the first endpoint changing an input of the first communication channel from the real time video stream to the image to be sent, for sending the first version of the image to the second endpoint by using the first communication channel.

The method may comprise the image to be sent being an image acquired by the imaging device in response to the request, or an image rendered based on an electronic file.

The first endpoint may comprise a video encoder.

The step of the first endpoint sending a video stream acquired by the imaging device to a second endpoint of the plurality of endpoints for video communication may comprise the video encoder generating the video stream based on video information acquired by the imaging device.

The step of the first endpoint respectively generating a first version of the image and a second version of the image may comprise the video encoder generating the first version of the image based on an image acquired by the imaging device in response to the request, or based on an electronic file.

The first version of the image may form a last frame of the video stream.

The method may comprise the first endpoint continuously sending the first version of the image to the second endpoint, until the second endpoint receives the second version of the image.

The step of the first endpoint respectively sending the first and second versions of the image to the second endpoint may comprise the first endpoint establishing a second communication channel between the first and second endpoints for sending the second version of the image and the first endpoint sending the second version of the image to the second endpoint by using the second communication channel.

The first endpoint may comprise an image encoder. The step of the first endpoint respectively generating a first version of the image and a second version of the image may comprise the image encoder generating the second version of the image based on an image acquired by the imaging device in response to the request, or based on an electronic file.

The method may comprise after receiving the second version of the image, the second endpoint replacing the received first version of the image with the received second version of the image.

The method may comprise after the second endpoint receiving the second version of the image, the first endpoint resuming sending the video stream acquired by the imaging device to the second endpoint for video communication.

The method may comprise after the second endpoint receiving the second version of the image, the second endpoint informing the first endpoint that the second version of the image is received.

The method may comprise when the second endpoint fails to receive the second version of the image, the second endpoint informing the first endpoint that the second version of the image is not received.

The method may comprise the first endpoint sending any of the first and second versions of the image to another one or more of the plurality of endpoints excluding the first and second endpoints.

The method may comprise the first endpoint sending any of the first and second versions of the image to each of the plurality of endpoints excluding the first endpoint.

The method may comprise the first endpoint sending both of the first and second versions of the image to each of the plurality of endpoints excluding the first endpoint. The step of the first endpoint respectively sending the first and second versions of the image to the second endpoint may comprise the first endpoint sending information of the second version of the image to the second endpoint, prior to sending the second version of the image to the second endpoint.

The method may comprise in response to the information, the second endpoint sending a reply to the first endpoint indicating accepting or refusing to receive the second version of the image; if the reply indicating accepting to receive the second version of the image, the first endpoint sending the second version of the image to the second endpoint.

According to a second aspect, a communication method is provided between a plurality of endpoints, wherein a first endpoint of the plurality of endpoints comprises an imaging device, the method comprising:
the first endpoint sending a video stream acquired by the imaging device to a second endpoint of the plurality of endpoints for video communication, by using a first communication channel between the first and second endpoints;
any of the plurality of endpoints initiating a request for pausing the video stream;
in response to said request, the imaging device acquiring an image;
the first endpoint respectively generating a first version of the image and a second version of the image;
wherein the first and second versions of the image depict one or more same objects;
wherein at least one property of the first version of the image is different from said at least one property of the second version of the image, such that a quality of the first version of the image is lower than a quality of the second version of the image;
the first endpoint respectively sending the first and second versions of the image to the second endpoint, comprising:
the first endpoint sending the first version of the image by using the first communication channel;
wherein the first version of the image forms a last frame of the video stream;
the first endpoint establishing a second communication channel between the first and second endpoints, and sending the second version of the image to the second endpoint by using the second communication channel;
the second endpoint receiving the first version of the image prior to receiving the second version of the image;
the first endpoint continuing sending the first version of the image, until the second endpoint receiving the second version of the image.

According to a third aspect, a communication system is provided comprising a plurality of endpoints, wherein a first endpoint of the plurality of endpoints comprises an imaging device; wherein the first endpoint is configured to send a video stream acquired by the imaging device to a second endpoint of the plurality of endpoints for video communication, by using a first communication channel between the first and second endpoints; wherein any of the plurality of endpoints is configured to initiate a request for requesting the first endpoint to send an image to the second endpoint, wherein the image is a still image; wherein the first endpoint is configured to respectively generate a first version of the image and a second version of the image; wherein the first and second versions of the image depict one or more same objects; wherein at least one property of the first version of the image is different from said at least one property of the second version of the image, such that a quality of the first version of the image is lower than a quality of the second version of the image; wherein the first endpoint is configured to respectively send the first and second versions of the image to the second endpoint; and the second endpoint is configured to receive the first version of the image prior to receiving the second version of the image.

DESCRIPTION OF EMBODIMENTS

The present invention will now be described more fully hereinafter with reference to the accompanying drawings, in which currently preferred embodiments of the invention are shown.

In connection with FIG. 1, a communication system comprising a plurality of endpoints will be discussed in more detail.

Figure 1:
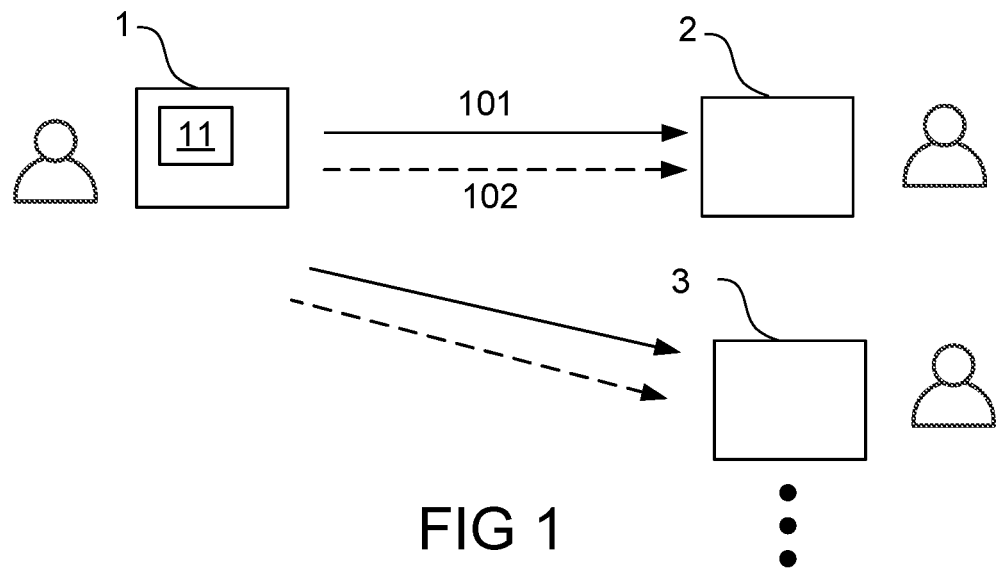
FIG. 1 is an example of a communication system.

In the example of FIG. 1, the communication system comprises a plurality of endpoints 1, 2, 3, . . . . The communication system comprises at least two endpoints 1, 2. The first and second endpoints 1, 2 are two different endpoints. In the example of FIG. 1, only three endpoints 1, 2, 3 are shown. However, the system may comprise more than three endpoints.

Each endpoint may be a smartphone, a tablet, a laptop, a pair of smart glasses, or a personal computer, etc. Each endpoint 1, 2, 3, . . . , may be associated to at least one user (a single user is shown as an example in FIG. 1 for each endpoint).

The first endpoint 1 of the plurality of endpoints comprises an imaging device 11. Any other endpoint(s) may comprise an imaging device.

The imaging device 11 may be a camera, e.g., a camera of a smartphone, of a tablet, of a laptop, of a pair of smart glasses, etc. The imaging device may be any suitable type of digital camera capable of capturing an image and/or a video stream.

The imaging device 11 may be an integral imaging device of the first endpoint 1, as shown in FIG. 1.

The imaging device 11 may be an external imaging device connected to the first endpoint 1, e.g., by a cable, such as a USB cable, or wirelessly, such as via Bluetooth or WLAN.

The first endpoint 1 is configured to send a video stream acquired by the imaging device 11 to the second endpoint 2 for video communication, by using a first communication channel 101 between the first and second endpoints 1, 2.

The first communication channel 101 may be a channel for transferring video streams. The first communication channel 101 may be a RTC video feed channel. The first and second endpoints 1, 2 may conduct a real-time video communication.

The video stream may be a live video stream for real-time video communication.

The video stream may comprise a sequence of still images, e.g., acquired by the imaging device 11 for conveying content and information of one or more objects. A still image may be an electronic image file, e.g., of a format such as JPEG, PNG, or TIFF. A still image may be a static image.

The video stream may comprise a sequence of frames. Each frame may be an image acquired by the imaging device 11.

Any of the plurality of endpoints 1, 2, 3, . . . , is configured to initiate a request for requesting the first endpoint 1 to send a still image to the second endpoint 2.

The image may be acquired by the imaging device 11. For example, the first version of the image may be a last frame of a live video. The user of the second endpoint 2 may perceive the live video is frozen or paused in response to the request to send the image. The image may comprise information relating to a problem and/or a task that a user of the first endpoint 1 is trying to solve.

The image may be an electronic image file locally stored in the first endpoint 1. The image may be rendered for representing information of an electronic file locally stored in the first endpoint 1. The image may comprise information relating to a guidance and/or an instruction that a user of the second endpoint 2 needs for solving a problem and/or performing a task.

The first, the second, or any other endpoint may initiate the request to send an image.

The first endpoint 1 is configured to respectively generate a first version of the image and a second version of the image. The first and second versions of the image depict one or more same objects. The first and second versions of the image may depict an environment.

At least one property of the first version of the image is different from said at least one property of the second version of the image, such that a quality of the first version of the image is lower than a quality of the second version of the image.

The at least one property may comprise any of: compression grade, compression method, file size, resolution, number of pixels, number of colors. The at least one property of an image may influence any of the displaying, storing, encoding, decoding and/or transmitting of the image.

For example, the first version of the image may have a smaller file size, a lower resolution, and/or a fewer number of pixels, comparing with the second version of the image. In other words, the quality of the first version of the image is not as good as (i.e., lower than) the quality of the second version of the image, due to the differences of the at least one property between the two versions.

Image compression may be a type of data compression applied to digital images, to reduce their cost (e.g., to reduce a file size) for storage and/or transmission.

The term "compression grade" may refer to a degree of image compression.

Compression method may include, but not limited to, lossy compression, such as color quantization, chroma sub-sampling, fractal compress, and lossless image compression, such as run-length encoding.

The quality of an image may refer to a level of accuracy of the object(s) and/or the environment depicted by the image. A viewer may perceive that the second version of the image is more accurate than the first version of the image. The first version of the image may comprise fewer details of the object(s) and/or the environment the image depicting comparing with the second version of the image.

The one or more same objects may be physical objects that the imaging device 11 acquires information from. For example, the objects may comprise a machine, a circuit board, a control panel, a component, etc., that the user of the first endpoint 1 is trouble shooting. The first version of the image may comprise fewer details of the physical object(s) comparing with the second version of the image.

The one or more same objects may be digital objects, such as an electronic file locally stored in the first endpoint 1. The first and second versions of the image may be rendered based on the electronic file, for expressing contents and information of the electronic file. For example, the object may be a Word file comprising flow chart instructions for solving a problem that the user of the second endpoint 2 is about to solve. The first version of the image may be a compressed version, which comprises e.g., fewer colors and/or fewer pixels.

The environment may be a background of the one or more objects, for example, an installation context, an electrical cabinet, a machine, a part of a machine, etc.

The first endpoint 1 is configured to respectively send the first and second versions of the image to the second endpoint 2. The first and second versions of the image may be configured to be sent by using two different channels respectively, i.e., the first communication channel 101 and a second communication channel 102.

The second endpoint 2 is configured to receive the first version of the image prior to receiving the second version of the image.

It takes a shorter time for transferring the first version of the image than transferring the second version of the image from one endpoint to another endpoint.

It is advantageous as a user may almost immediately start working with the first version of the image (of lower quality) until the second version of the image (of higher quality) is received. This may improve the efficiency of the cooperation between the users of the first and second endpoints. The user experience may be improved.

Upon receiving the second version of the image, the second endpoint 2 may be configured to replace the received first version of the image with the received second version of the image.

In connection with FIG. 2, the communication method between a plurality of endpoints as described in FIG. 1 will be discussed in more detail.

Figure 2:
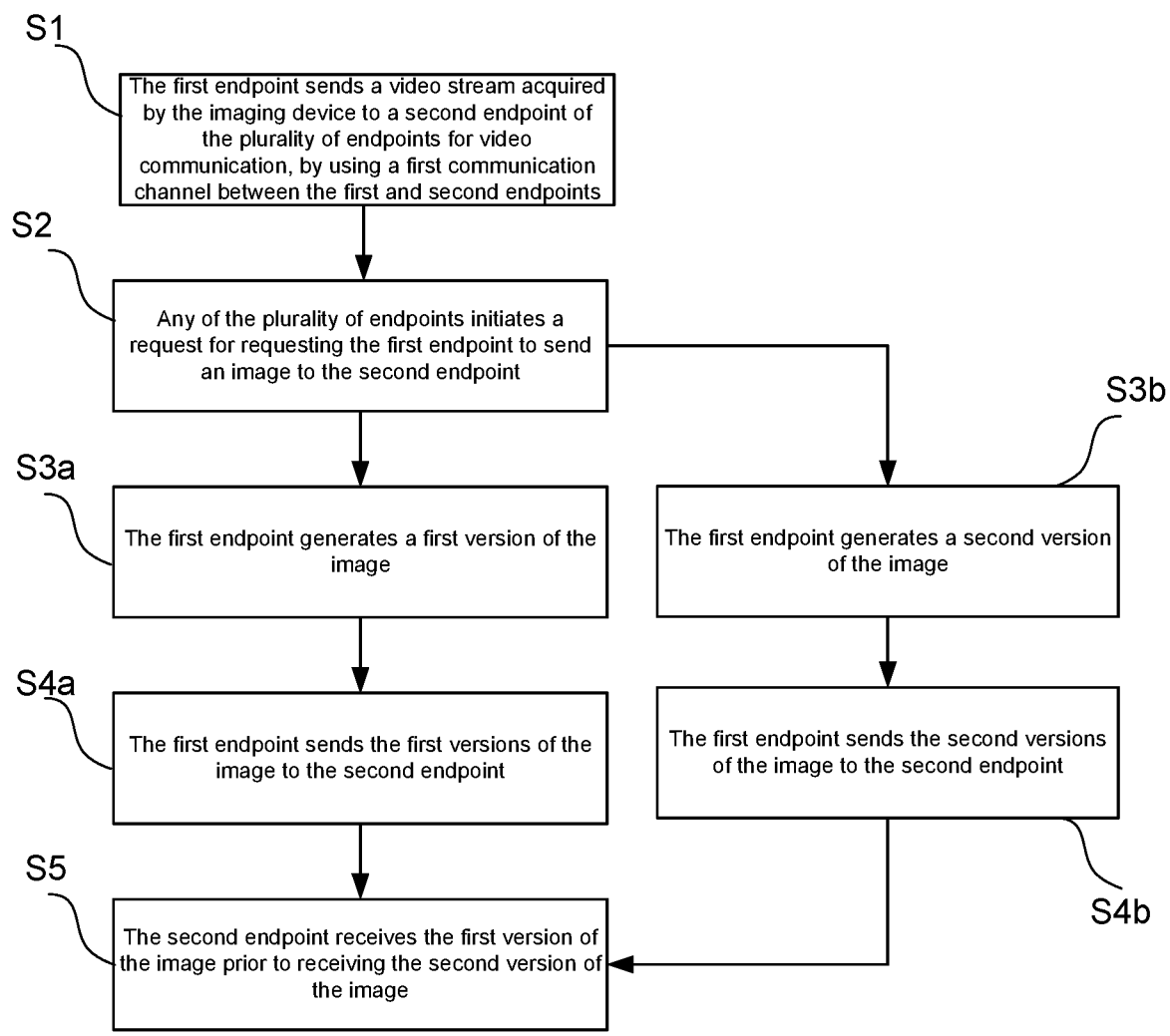
FIG. 2 is an example of a diagram of a communication method.

FIG. 2 is an example of a diagram of a communication method between a plurality of endpoints.

The method comprises the first endpoint 1 sending a video stream acquired by the imaging device 11 to a second endpoint 2 of the plurality of endpoints for video communication, by using a first communication channel 101 between the first and second endpoints (S1). The video stream may be a live video stream. The first and second endpoint 1, 2 may conduct a real-time video communication.

The method comprises any of the plurality of endpoints initiating a request for requesting the first endpoint 1 to send an image to the second endpoint 2 (S2), wherein the image is a still image. The method comprises the first endpoint respectively generates a first version of the image (S3a) and a second version of the image (S3b). The first and second versions of the image depict one or more same objects. At least one property of the first version of the image is different from said at least one property of the second version of the image, such that the quality of the first version of the image is lower than the quality of the second version of the image. In response to the request, the first endpoint 1 generates two different version of the same image for sending to the second endpoint 2.

The method comprises the first endpoint 1 respectively sends the first (S4a) and second versions (S4b) of the image to the second endpoint 2, and the second endpoint 2 receives the first version of the image prior to receiving the second version of the image (S5).

The steps S3a, S3b may comprise in response to the request, the imaging device 11 acquiring an image, and the first endpoint 1 respectively generating the first and second versions of the image based on the acquired image.

The request may be a request for pausing the video stream. For example, a user of any endpoint may request for pausing the video stream.

The first version of the image may be a last frame of the video stream. To the user of the second endpoint 2, the video stream may appear to be paused by displaying the received first version of the image.

The step of the imaging device acquiring an image may comprise the imaging device 11 acquiring the image by using a focal length being different from a focal length used for acquiring the video stream.

The image may be a zoomed in or a zoomed out image.

The zoomed in image may increase the apparent size of the objects depicted by the image and fewer objects may become visible. The zoomed out image may reduce the apparent size of the objects depicted by the image and more objects may become visible.

The zoom function may improve the flexibility of the method. For example, a focal length of the imaging device may be increased or reduced to acquire a zoomed image, depending on the needs of a user.

Alternatively, the image may be acquired by using the same focal length as the focal length used for acquiring the video stream.

Alternatively, or in combination, the first and second versions of the image may depict the same part of the object(s) depicted by the acquired image, instead of the complete object(s), e.g., by cropping. For example, the first and second versions of the image may be cropped versions.

The steps S3a, S3b may comprise in response to the request, the first endpoint 1 generating the first and second versions of the image based on an electronic file.

The request may be a request for sharing information. For example, a user of any endpoint may request the first endpoint 1 to share content of an electronic file, e.g., locally stored in the first endpoint 1.

The electronic file may be stored in a local memory, e.g., of the first endpoint 1.

The content of the electronic file may comprise a guidance and/or an instruction for the user of the second endpoint 2 to solve a problem and/or perform a task.

The electronic file may be a still image. The electronic file may be of a format that is not a still image. The method may comprise converting the electronic file into a still image. There are known file converters for converting electronic files of different formats into still images.

The step S4a may comprise the first endpoint 1 sending the first version of the image by using the first communication channel 101 between the first and second endpoints.

The first version of the image may be sent as if it is a video steam via the first communication channel 101.

The video communication may appear to be temporally paused, when the first communication channel 101 is used for sending the first version of the image, instead of a live video source, e.g., from a camera. In other words, instead of receiving the live video, the second endpoint 2 may stream the first version of the image. Thus, the user of the second endpoint 2 would perceive a pause of the video communication.

The quality of the first version of the image may be adjusted according to a condition of the network delivering the first communication channel 101. The network delivering the first and the second communication channels may be any type of network, such as 3G/4G/5G cellular networks.

For example, the quality of the first version of the image may be reduced, when the bandwidth of the first communication channel 101 is low, and/or when the quality of the first communication channel 101 is poor.

The quality of the first version of the image may be increased, when the bandwidth of the first communication channel 101 is high, and/or when the quality of the first communication channel 101 is good.

The user of the second endpoint 2 may immediate start working based on the received first version of the image.

To the user of the second endpoint 2, it would appear that the transfer of the video stream from the first endpoint 1 is paused or frozen. In other words, the user of the second endpoint 2 would perceive that the live video is paused in response to the request.

The step S4a may comprise the first endpoint 1 changing an input of the first communication channel 101 from the video stream to the image to be sent, for sending the first version of the image to the second endpoint 2 by using the first communication channel 101.

Input to a communication channel may be data or information feeding into the communication channel for transferring.

The input of the first communication channel 101 may originally be the video stream acquired by the imaging device 11. The input of the first communication channel 101 may be changed to the image to be sent.

The image to be sent may be stored in an intermedia, e.g., a canvas element. The stored image may be input to the first communication channel 101.

By changing the input of the first communication channel 101, an image (e.g., the first version of the image) may be sent to the second endpoint 2 by using the first communication channel 101, without establishing an additional communication channel.

The input of the first communication channel 101 may be changed to an image acquired by the imaging device in response to the request, or an image rendered based on an electronic file, e.g., locally stored in the first endpoint 1.

Said input image may be processed as if it is a video steam. For example, said input image may be encoded by an encoder of the first endpoint 1 before being sent to the second endpoint 2 via the first communication channel 101, and decoded by a decoder of the second endpoint 2 when received by the second endpoint 2.

For example, the step S3a may comprise the first endpoint 1 generating the first version of the image by encoding said input image with the encoder.

The image to be sent may be an image acquired by the imaging device in response to the request, or an image rendered based on an electronic file.

The first endpoint 1 may comprise a video encoder. The video encoder may be, e.g., a live video encoder, H264 or VP 8, hardware, or software encoder. The compression of the video encoder may be lossy.

The step S1 may comprise the video encoder generating the video stream based on video information acquired by the imaging device.

The step S3a may comprise the video encoder generating the first version of the image based on an image acquired by the imaging device 11 in response to the request, or based on an electronic file. The first version of the image may lack some information present in the acquired image.

The first version of the image may form a last frame of the video stream.

The method may comprise the first endpoint 1 continuing sending the first version of the image to the second endpoint 2, until the second endpoint 2 receives the second version of the image.

The first endpoint 1 may continue sending the first version of the image in parallel to sending the second version of the image, until the second version of the image is successfully delivered. In other words, the first endpoint 1 may stream the first version of the image (a video stream comprising multiple same frames) to the second endpoint 2, until the second version of the image is successfully delivered.

The first version of the image may become the last frame of the video stream received by the second endpoint 2. To the user of the second endpoint 2, it would appear that the transfer of the video stream from the first endpoint 1 to the second endpoint 2 is frozen or paused. And said user may immediately work on the temporally frozen or paused last frame of the video stream, i.e., the first version of the image.

When the second endpoint 2 receives the second version of the image, the first endpoint 1 may stop sending the first version of the image.

The method may comprise the first endpoint 1 sending the first and/or second versions of the image to one or more additional endpoints (e.g., endpoint 3 in FIG. 1), the first endpoint 1 may continue sending the first version of the image to all receiving endpoints, until the second version of the image is successfully delivered to each of the receiving endpoints. The method may comprise each of the receiving endpoints informing the first endpoint 1 when it has received the second version of the image.

The step S4b may comprise the first endpoint 1 establishing a second communication channel 102 between the first and second endpoints 1, 2 for sending the second version of the image; and the first endpoint 1 sending the second version of the image to the second endpoint 2 by using the second communication channel 102.

The second communication channel 102 may be a channel for transferring arbitrary data, such as image data.

The quality of the second version of the image may not be adjusted according to the condition of the second communication channel 102. For example, it may take longer time for transferring the second version of the image, when the bandwidth of the second communication channel 102 is low, and/or when the quality of the second communication channel 102 is poor.

The first and second communication channels 101, 102 may be of the same or different types of network, such as a 3g/4g/5g cellular network.

The first endpoint 1 may comprise an image encoder. The image encoder may be a Portable Network Graphics (PNG) encoder. PNG encoder can perform a lossless image compression to reduce the amount of data required for transferring the image, without losing any details of the image.

The step S3b may comprise the image encoder generating the second version of the image based on an image acquired by the imaging device 11 in response to the request, or based on an electronic file. The compression of the image encoder may be lossless. The second version of the image may be compressed by the image encoder losslessly.

The method may comprise after receiving the second version of the image, the second endpoint 2 replacing the received first version of the image with the received second version of the image.

To the user of the second endpoint 2, the replacement may be automatically and seamless. In other words, the user would immediately perceive that the quality of the image, e.g., the resolution, is improved, after the second endpoint 2 receives the second version of the image.

It is advantageous that before the second version of the image is received, the user can start working with the first version of the image (of low quality); and after the second version of the image is received, the user can continue working with the second version of the image (of high quality).

The method may comprise after the second endpoint 2 receiving the second version of the image, the first endpoint 1 resuming sending the video stream acquired by the imaging device 11 to the second endpoint 2 for video communication.

The first endpoint 1 may restore the original input of the first communication channel 101, i.e., the video stream acquired by the imaging device 11.

To the user of the second endpoint 2, it would appear that the transfer of the live video from the first endpoint 1 to the second endpoint 2 resumes. In other words, the paused video stream may resume, after the second version of the image is delivered.

The method may comprise the first endpoint 1 sending any of the first and second versions of the image to another one or more of the plurality of endpoints excluding the first and second endpoints (e.g., the endpoint 3 in FIG. 1).

The first endpoint 1 may send any one or both of the first and second versions of the image to more than one endpoint. In other words, besides cooperating with the user of the second endpoint 2, the user of the first endpoint 1 may also cooperate with users of one or more other endpoints by sharing the first and/or second versions of the image with them. These users may have a real-time video communication with the user of the first endpoint 1 and/or the second endpoint 2.

The above examples relating to the communication between the first and second endpoints 1, 2 are also applicable to the communication between the first and other endpoints.

The step S4b may comprise the first endpoint 1 sending information of the second version of the image to the second endpoint 2, prior to sending the second version of the image to the second endpoint 2.

In response to the information, the second endpoint 2 may send a reply to the first endpoint 1 indicating accepting or refusing to receive the second version of the image. Only if the reply indicating accepting to receive the second version of the image, the first endpoint 1 may send the second version of the image to the second endpoint 2.

The information of the second version of the image may be information related to the transfer of the second version of the image, e.g., file size, file hash, and/or number of chunks of the second version of the image for transferring.

Since the second version of the image is sent by using the second communication channel 102, i.e., a newly established data channel, the information of the second version of the image may need to be sent to the second endpoint 2 prior to the transfer of the second version of the image. The second endpoint 2 may determine whether it would accept or refuse to receive the second version of the image. This may improve the flexibility of the method.

Since the first version of the image is sent by using the existing first communication channel 101 for video communication, it may not be necessary to send information of the first version of the image to the second endpoint 2. However, it may be beneficial to inform the second endpoint 2 about the transfer of the first version of the image in advance.

The method may be implemented using any real-time communication protocol that supports real-time video and data communication.

The examples of FIGS. 3A to 4B are implemented based on Web Real-Time Communication, WebRTC, a free and open-source project for providing web browsers and mobile applications for real-time communication. WebRTC provides built-in capabilities for establishing real-time video, audio, and data streams for interactive sessions between two or more participants. More details about WebRTC can be found at https://www.w3.org/TR/webrtc/.

In connection to FIG. 3A, an example of the first endpoint 1 will be discussed in more detail. The first endpoint 1 is considered to be a sender in this example.

Figure 3A:
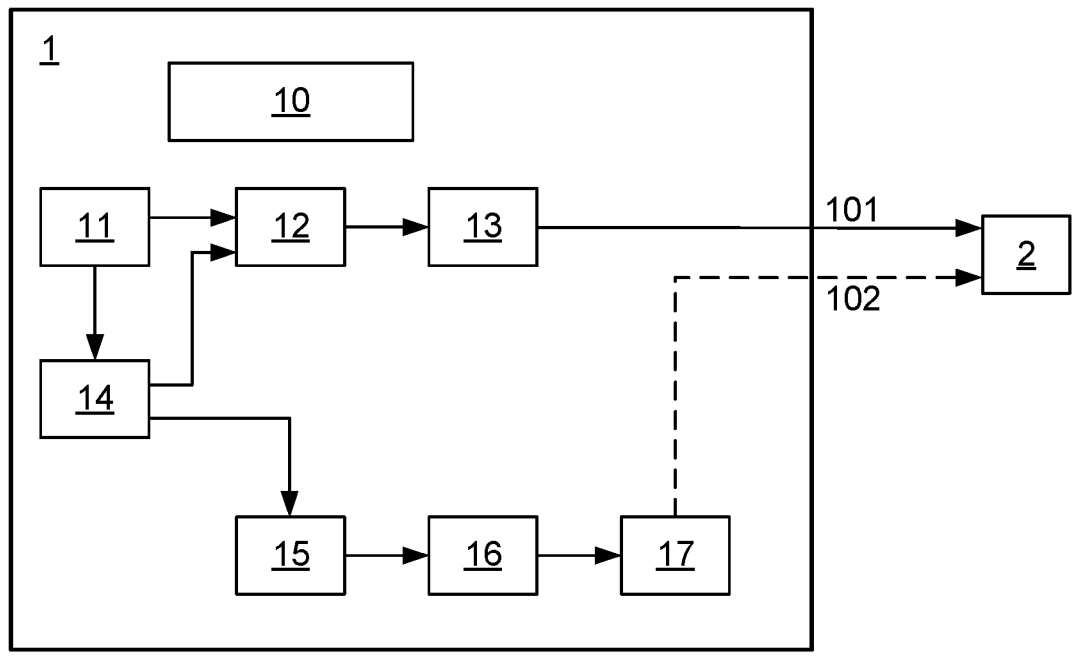
FIG. 3A is an example of a schematic diagram of a first endpoint.

In FIG. 3A, the first endpoint 1 comprises a camera 11, a video encoder 12, and a RTC video feed 13 for a real-time video communication.

The camera 11, e.g., a live video camera, may acquire a live video stream.

The video encoder 12 may be a live video encoder, e.g., H264 or VP8 hardware or software encoder. The video encoder 12 may compress the acquired live video stream. The compression of the video encoder 12 may be lossy.

The RTC video feed 13 may be a real-time video track for sending and receiving a live video over a network, e.g., WebRTC video track. The RTC video feed 13 may prepare the compressed live video stream for transferring over the first communication channel 101 to the second endpoint 2.

In FIG. 3A, the first endpoint 1 comprises a canvas 14, an image encoder 15, an image chunker 16, and an image sender 17.

The canvas or a canvas element, is a model allowing a dynamic rendering of images. The canvas is typically integrated in a web browser, e.g., HTML canvas.

The canvas 14 can hold an uncompressed still image. The canvas 14 can be used as an input source for feeding the image it held to any one or both of the video encoder 12 and the image encoder 15.

In response to the request for requesting the first endpoint 1 to send an image to the second endpoint 2, the camera 11 may acquire an image. The acquired image may be stored in the canvas 14. The canvas 14 may hold the acquired image as an input for the video encoder 12 and/or the image encoder 15.

The video encoder 12 may have two different inputs, i.e., the video stream acquired by the imaging device 11 and the image held by the canvas 14.

The video encoder 12 may compress the acquired image held in the canvas 14 to generate the first version of the image for sending via the first communication channel 101. The video encoder 12 may send the compressed image, i.e., the first version of the image, to the established RTC video feed 13 for sending the first version of image via the first communication channel 101. The second endpoint 2 may perceive that the live video is paused (frozen) in response to the request of sending the image.

The image encoder 15 may be a still image encoder, e.g., Portable Network Graphics (PNG) encoder. The compression of the image encoder 15 may be lossless. The image encoder 15 may compress the image held in the canvas 14 losslessly to generate the second version of the image for sending via the second communication channel 102. The second communication channel 102 may be a real-time data channel for transporting arbitrary data over a network.

The image chunker 16 may be configured to receive a compressed image (e.g., a PNG image), i.e., the second version of image, from the image encoder 15 and divide it into a plurality of image chunks.

The image chunker 16 may be configured calculate a total size (e.g., in bytes) of the second version of the image, and a number of chunks needed to divide the second version of the image into.

The image sender 17 may be configured to pace the transfer of the divided image chunks over the second communication channel 102. That is, the image sender 17 may receive the image chunks from the image chunker 16 and deliver them to the second communication channel 102 at appropriate pace based on the network conditions of the second communication channel 102.

For example, when the network condition is poor, the image sender 17 may hold delivery and wait until the network condition is improved. When the delivery pace has been too high, the image sender 17 may hold delivery. When a user requests to stop transferring the second version of the image, the image sender 17 may stop transferring the image chunks.

In FIG. 3A, the first endpoint 1 comprises a processing circuit 10. The processing circuit 10 may be configured to control other components of the first endpoint 1 and/or implement the function of the first endpoint 1.

For example, the processing circuit 10 may control the first endpoint 1 to change an input of the first communication channel 101 from the video stream to the image to be sent (e.g., from the live video acquired by the camera 11 to the image held by the canvas 14), for sending the first version of the image to the second endpoint 2 by using the first communication channel 101.

For example, the processing circuit 10 may set up one or more communication channels, in addition to the second communication channel 102.

The processing circuit 10 may be, for example a central processing unit (CPU), microcontroller, or microprocessor and/or any other electronic function unit which may perform functions.

The first endpoint 1 may comprise a memory. The processing circuit 10 may be configured to execute program codes stored in the memory, in order to carry out functions and operations of the first endpoint 1.

The memory may be one or more of a buffers, a flash memory, a hard drive, a removable medium, a volatile memory, a non-volatile memory, a random-access memory (RAM), or another suitable device. In a typical arrangement, the memory may include a non-volatile memory for long term data storage and a volatile memory that functions as a system memory for the first endpoint 1. The memory may exchange data with the processing circuit over a data bus. Accompanying control lines and an address bus between the memory and the processing circuit also may be present.

Functions and operations of the first endpoint 1 may be embodied in the form of executable logic routines (e.g., lines of code, software programs, etc.) that are stored on a non-transitory computer readable medium (e.g., the memory) of the first endpoint 1 and are executed by the processing circuit 10.

Furthermore, the functions and operations of the first endpoint 1 may be a stand-alone software application or form a part of a software application that carries out additional tasks related to the first endpoint 1. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The first endpoint 1 may comprise a user interface. The user interface may be configured to output data and to receive data from one or several input devices. The user interface may send the received data to the processing circuit 10 for further processing.

The user interface may include a display for displaying the output data. The output data may comprise the first and second versions of the image, the video stream, etc.

The first endpoint 1 may comprise an input device. The input device may be a computer mouse, a keyboard, a track ball, a touch screen, or any other input device.

In connection with FIG. 3B, an example of the second endpoint 2 will be discussed in more detail. The second endpoint 2 is considered to be a receiver in this example.

Figure 3B:
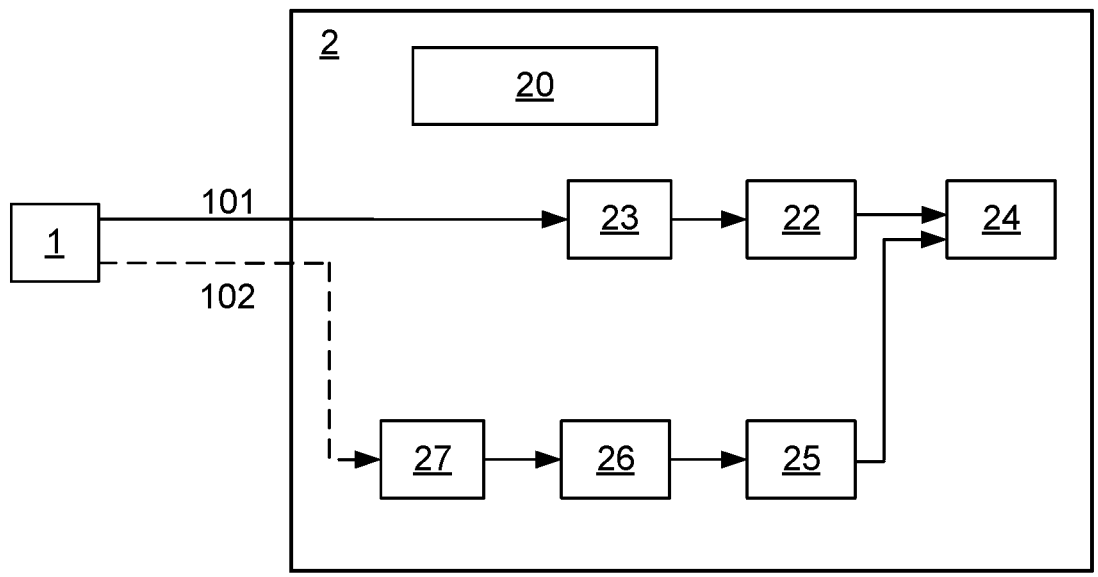
FIG. 3B is an example of a schematic diagram of a second endpoint.

In FIG. 3B, the second endpoint 2 comprises a RTC video feed 23, and a video decoder 22.

The RTC video feed 23 may be a real-time video track for sending and receiving a live video over a network, e.g., WebRTC video track. The RTC video feed 23 may receive the compressed video stream and/or the compressed image from the first endpoint 1 via the first communication channel 101.

The video decoder 22 may be a live video decoder, e.g., H264 or VP8 hardware or software decoder. The video decoder 22 may uncompress the compressed video stream and/or the compressed image received by the RTC video feed 23. The uncompressed image may be the first version of the image.

In FIG. 3B, the second endpoint 2 comprises an image receiver 27, a chunk combiner 26 and an image decoder 25.

The image receiver 27 may receive the image chunks from the second endpoint 2 via the second communication channel 102. The image receiver 27 may be configured to inform the first endpoint 1 when all the image chunks are received.

The chunk combiner 26 may combine the image chunks received by the image receiver 27 into one compressed image (e.g., a PNG image).

The image decoder 25 may be a still image decoder, e.g., PNG decoder. The image decoder 25 may decode/uncompress the compressed image to retrieve the second version of the image.

In FIG. 3B, the second endpoint 2 comprises a canvas 24 and a processing circuit 20. The canvas 24 may be the same type as the canvas 14 discussed in connection to FIG. 3A.

The canvas 24 can hold a still image. The canvas 24 may display the first version of the image received from the video decoder 22, and/or the second version of the image received from the image decoder 25. The canvas 24 may replace the received first version of the image with the received second version of image.

In response to the request of requesting the first endpoint 1 to send an image to the second endpoint 2, the first endpoint 1 may send the first version of the image, instead of the live video, via the first communication channel 101. The canvas 24 may display the first version of the image received from the video decoder 22. The user of the second endpoint 2 would perceive that the live video is paused as the last frame of the video is the first version of the image held by the canvas 24.

When the second version of the image is received, the canvas 24 may display the second version of the image received from the image decoder 25. In other words, the displayed first version of the image may be automatically replaced by the second version of the image in the canvas 24.

The processing circuit 20 may be configured to control other components of the second endpoint 2 and/or implement the function of the second endpoint 2. The processing circuit 20 may be the processing circuit discussed in connection to FIG. 1.

For example, the processing circuit 20 may inform the first endpoint 1 when the transfer of the second version of the image is complete, through the second communication channel 102. The processing circuit 20 may set up one or more communication channels for transferring data with any endpoint.

The above discussed features of the first endpoint 1 and the second endpoint 2 are interchangeable and combinable. The first endpoint 1 may be a receiver. The second endpoint 2 may be a sender.

The above discussed features of the first endpoint 1 and the second endpoint 2 are applicable to any other endpoint(s).

In connection with FIGS. 4A and 4B, another example of the communication method between a plurality of endpoints will be discussed in more detail.

Similar to the method discussed in connection with FIG. 2, the example method comprises the steps S1 to S5 of FIG. 2, wherein the request of S2 is a request for pausing the video stream initiated by any of the plurality of endpoints in this example. In other words, in this example method, a user of any endpoint may initiate a request for pausing the video stream in step S2. For example, the user of the second endpoint 2 may request to pause the video stream such that he can see more details about one or more objects of interest in a paused video stream.

The example method comprises in response to said request, the imaging device 11 acquiring an image for generating a first version of the image and a second version of the image in steps S3a and S3b.

In steps S4a and S4b, the example method comprises: the first endpoint 1 sending the first version of the image by using the first communication channel 101 (S4a); and the first endpoint 1 establishing a second communication channel 102 between the first and second endpoints and sending the second version of the image to the second endpoint by using the second communication channel 102 (S4b).

The example method comprises the first endpoint 1 continuing sending the first version of the image, until the second endpoint receiving the second version of the image.

The first version of the image will be sent via the first communication channel 101 which is prepared for video communication. In other words, the first version of the image (a still image) will be streamed to the second endpoint 2, as if it is a video (by streaming a sequence of the same still image). The user of the second endpoint 2 would perceive that the video steam from the first endpoint 1 is paused. The first version of the image is the last frame of the paused video stream.

The example method may comprise upon the second endpoint 2 receiving the second version of the image, the second endpoint 2 replacing the received the first version of the image by the received second version of the image.

The user of the second endpoint 2 would perceive the quality of the paused the video steam being improved immediately after the second endpoint 2 receives the second version of the image.

In connection with FIG. 4A, the method steps performed by the first endpoint 1 (sender) will be discussed.

Figure 4A:
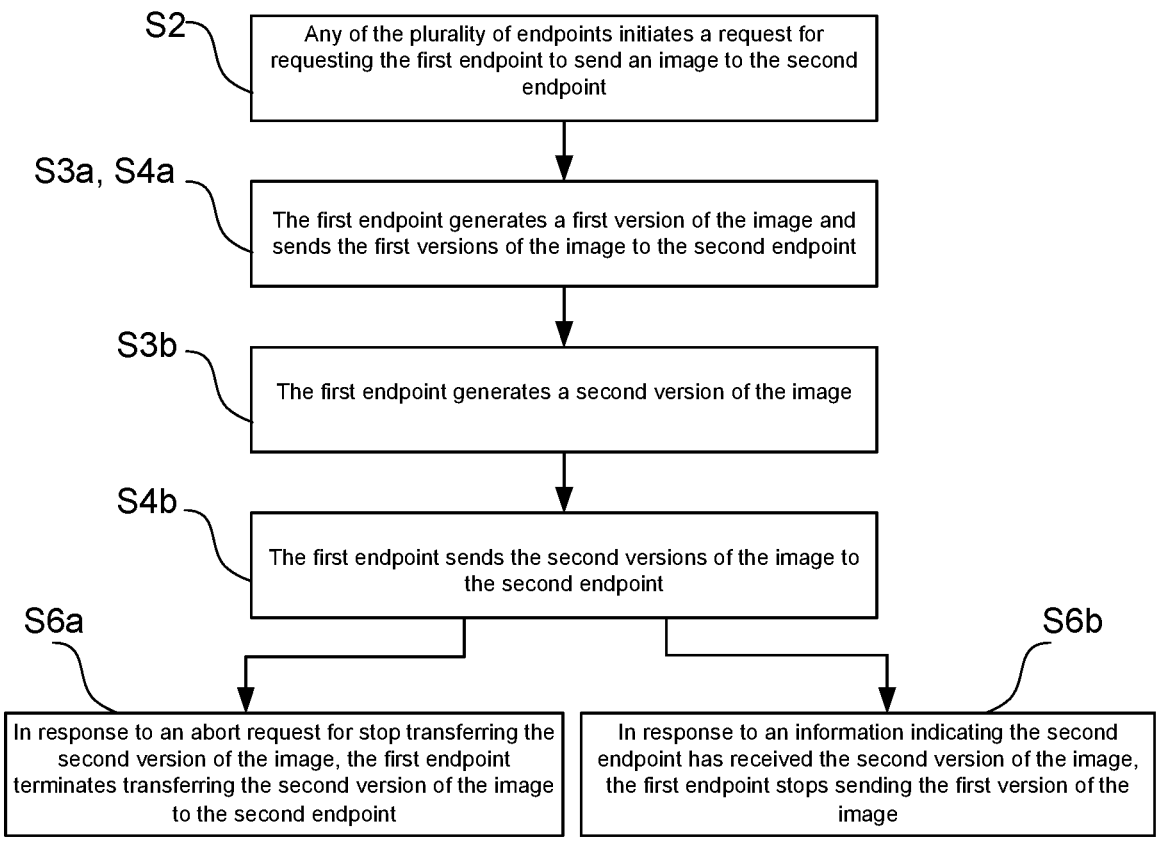
FIGS. 4A-4B are examples of a diagram of a communication method.
Figure 4B:
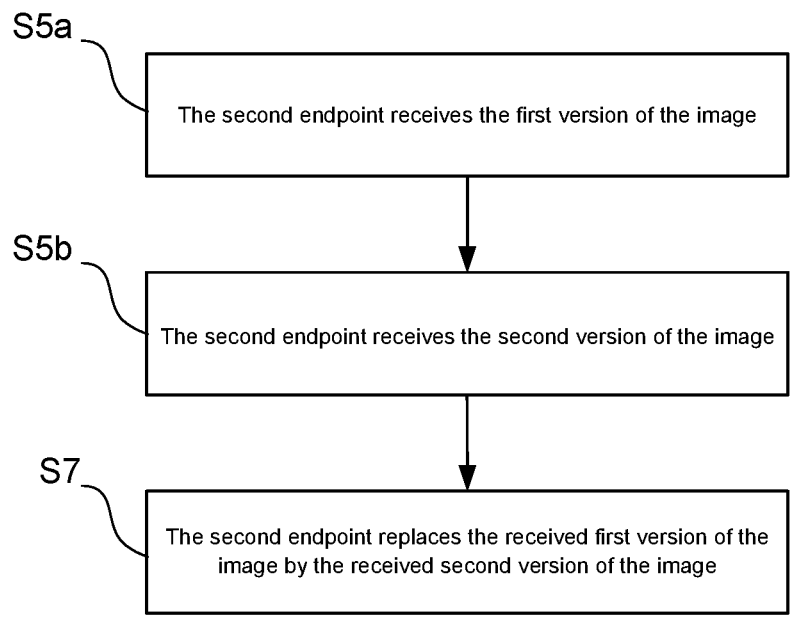

In FIG. 4A, the steps S3*a* and S4*a* are performed prior to the steps S3*b* and S4*b*. That is, the first version of the image may be generated and sent prior to the generation and transfer of the second version of the image. This may secure that the first version of the image may be received in a very short time such that the end user of the second endpoint 2 would perceive an immediate pause of the video steam after the pause request.

Alternatively, the generation of the first version of the image and the generation of the second version of the image may be performed in parallel.

The steps S3*a* and S4*a* may comprise the canvas 14 receiving the image acquired by the imaging device 11 in response to the pause request. The image held by the canvas 14 may be used as an input for generating the first and second version of the image.

The steps S3*a* and S4*a* may comprise the first endpoint 1 changing an input of the video encoder 12 from the video stream acquired by the imaging device 11 to the image held by the canvas 14.

The steps S3*a* and S4*a* may comprise the video encoder 12 generating the first version of the image based on the image held by the canvas 14. The video encoder 12 may compress and/or encode the image held by the canvas 14 to reduce its file size (e.g., in bytes). This compression and/or encoding is lossy.

The step S3*b* may comprise the image encoder 15 generating the second version of the image based on the image held by the canvas 14. The image encoder 15 may compress and/or encode the image held by the canvas 14. This compression and/or encoding is less lossy or lossless, such that the quality of the second version of the image is better than that of the first version of the image.

The step S3*b* may comprise the image chunker 16 dividing the second version of the image into a plurality of image chunks for sending to the second endpoint 2.

The step S3*b* may comprise the first endpoint 1 sending information of the second version of the image to the second endpoint 2, prior to sending the second version of the image to the second endpoint 2. The second endpoint 2 may refuse or accept to receive the second version of the image. This may improve flexibility of the method.

The step S4*b* may comprise the image sender 17 sending the plurality of image chunks to the second endpoint 2 using the second communication channel 102. The step S4*b* may comprise the image sender 17 suspending sending the image chunks when the second communication channel 102 is overloaded. The step S4*b* may comprise the image sender 17 continuing sending the image chunks when the second communication channel 102 is not overloaded.

The example method may comprise in response to an abort request for stop transferring the second version of the image, the first endpoint 1 terminating transferring the second version of the image to the second endpoint 2 (S6*a*).

The example method may comprise in response to an information indicating the second endpoint 2 has received the second version of the image, stopping sending the first version of the image (S6*b*). The video stream may resume after the second endpoint 2 has received the second version of the image.

In connection with FIG. 4B, the method steps performed by the second endpoint 2 (receiver) will be discussed.

In the example method, the step S2 may be the second endpoint 2 initiating the request for pausing the video stream.

In the example method, the step S5 may comprise the second endpoint 2 receiving the first version of the image (S5*a*) and receiving the second version of the image (S5*b*).

The step S5*a* may comprise the video decoder 22 decoding and/or uncompressing the compressed image received by the RTC video feed 23 from the first endpoint 1 via the first communication channel 101 to retrieve the first version of the image.

The step S5*a* may comprise the canvas 24 displaying the first version of the image decoded by the video decoder 22.

The step S5*b* may comprise the image receiver 27 receiving information regarding to the second version of the image, prior receiving the second version of the image. The information may be received through the first and/or the second communication channels.

The step S5*b* may comprise the image receiver 27 receiving the image chunks sent by the first endpoint 1 via the second communication channel 102.

The step S5*b* may comprise the chunk combiner 26 combining the chunks received by the image receiver 27.

The step S5*b* may comprise the image decoder 25 uncompressing and/or decoding the combined chunks to retrieve the second version of the image.

The example method may comprise the second endpoint 2 replacing the received first version of the image by the received second version of the image (S7).

The user of the second endpoint 2 would perceive the quality of the paused the video steam being improved immediately after the second endpoint 2 receives the second version of the image.

The step S7 may comprise the canvas 24 displaying the received second version of the image.

The step S7 may comprise the second endpoint 2 replacing an input to the canvas 24 from the video decoder 22 to the image decoder 25. The step S7 may comprise the second endpoint 2 informing a user associated to the second endpoint 2 that the second version of the image is displayed. The user may be notified by a text notification, a voice notification, or any other types of notification.

The step S7 may comprise the second endpoint 2 informing the first endpoint 1 that the second version of the image is received.

In the field of communication, e.g., telecommunication, signaling may refer to the use of different signals for controlling communication.

In connection to FIGS. 5A-5B, examples of signaling of communication between two endpoints will be discussed in more detail.

The signaling may use an existing data channel, e.g., the second communication channel 102. Alternatively, the signaling may use a new communication channel established for the related signaling between two endpoints.

Figure 5A:
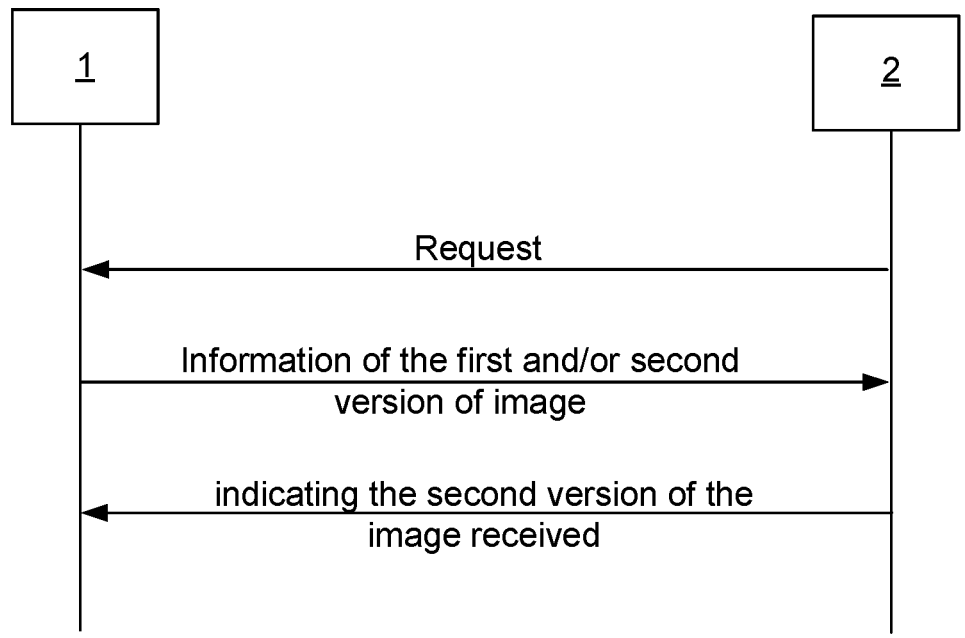
FIGS. 5A-5B are examples of signaling of a communication between two endpoints.

In FIG. 5A, the second endpoint 2 initiates a request for requesting the first endpoint 1 to send an image to the second endpoint 2. In response to the request, the first endpoint 1 generates a first version of the image and a second version of the image. Since the first version of the image is transferred via the existing first communication channel 101, its signaling, if there is any, is not discussed here.

Prior to sending the second version of the image, image information of the second version (optionally the first version) of the image may be generated and sent to the second endpoint 2. Since the second endpoint 2 initiates the request, the transfer of the second version of the image may be started without waiting for an approval from the second endpoint 2.

The image information may comprise, for example, the image size and the number of chunks needed, of the image to be transferred.

The first endpoint 1 then sends the second version of the image. Upon receiving the second version of the image, the second endpoint 2 sends a signal to the first end point 1 indicating the second version of the image is received.

Figure 5B:
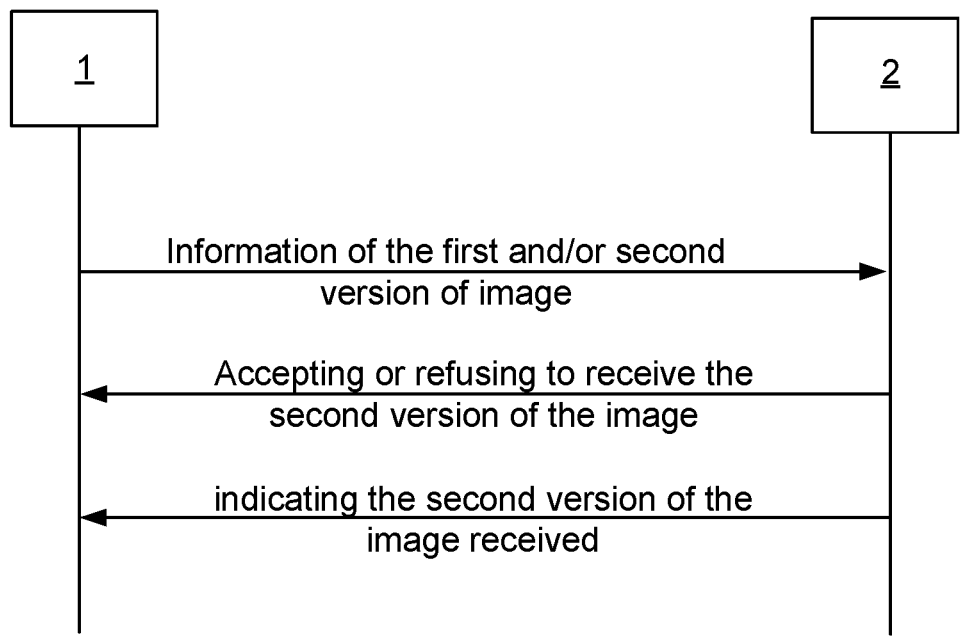

In FIG. 5B, either the first endpoint 1 or the second endpoint 2 may initiate a request for requesting the first endpoint 1 to send an image to the second endpoint 2.

In response to the request, the first endpoint 1 generates the first and second versions of the image. Since the first version of the image is transferred via the existing first communication channel 101, its signaling, if there is any, is not discussed here.

Prior to sending the second version of the image, image information of the second version (optionally the first version) of the image may be generated and sent to the second endpoint 2.

The image information may comprise, for example, the image size and the number of chunks needed, and a unique id, for example a hash, of the image to be transferred.

The second endpoint 2 sends a signal indicating accepting or refusing the reception of the second version of the image.

If the signal indicating accepting the second version of the image, the first endpoint 1 sends the second version of the image. If the signal indicating refusing the second version of the image, the first endpoint 1 does not send the second version of the image.

Upon receiving the second version of the image, the second endpoint 2 sends another signal to the first end point 1 indicating the second version of the image is received.

In addition, when the second endpoint 2 fails to receive the second version of the image, the second endpoint 2 may inform the first endpoint 1 that the second version of the image is not received.

The second endpoint 2 may inform the first endpoint 1 about the deliver status for each of the multiple chunks. Thus, the first endpoint 1 may only resend those chunks that are not received by the second endpoint 2, instead of resending all the chunks (i.e., instead of resending the complete second version of the image).

In the examples of FIG. 5A-5B, it is assumed that the data transfer over the second communication channel 102 is reliable, e.g., retransmission and reordering of missing data/chunks are guaranteed.

When using an unreliable data channel, i.e., reliable data delivery cannot be guaranteed, additional signals, such as, acknowledgment (ACK) and negative-acknowledgement (NAK or NACK) may be used to improve the robustness and reliability of the data transfer.

ACK/NACK signals may be used to indicate whether the second version of the image is successfully received or not, respectively. If not, the first endpoint 1 may resend the second version of the image to the second endpoint 2.

The invention is also defined by the following points 1-20.

Point 1. A communication method between a plurality of endpoints, wherein a first endpoint of the plurality of endpoints comprises an imaging device, the method comprising:

the first endpoint sending a video stream acquired by the imaging device to a second endpoint of the plurality of endpoints for video communication, by using a first communication channel between the first and second endpoints;

any of the plurality of endpoints initiating a request for requesting the first endpoint to send an image to the second endpoint, wherein the image is a still image;

the first endpoint respectively generating a first version of the image and a second version of the image;

wherein the first and second versions of the image depict one or more same objects;

wherein at least one property of the first version of the image is different from said at least one property of the second version of the image, such that a quality of the first version of the image is lower than a quality of the second version of the image;

the first endpoint respectively sending the first and second versions of the image to the second endpoint; and the second endpoint receiving the first version of the image prior to receiving the second version of the image.

Point 2. The method of point 1, wherein the step of the first endpoint respectively generating a first version of the image and a second version of the image comprises:

in response to the request, the imaging device acquiring an image; and the first endpoint respectively generating the first and second versions of the image based on the acquired image.

Point 3. The method of point 2, wherein the step of the imaging device acquiring an image comprises:

the imaging device acquiring the image by using a focal length being different from a focal length used for acquiring the video stream.

Point 4. The method of any of points 1-3, wherein the step of the first endpoint respectively generating a first version of the image and a second version of the image comprises:

in response to the request, the first endpoint generating the first and second versions of the image based on an electronic file.

Point 5. The method of any of points 1-4, wherein the step of the first endpoint respectively sending the first and second versions of the image to the second endpoint comprises:

the first endpoint sending the first version of the image by using the first communication channel.

Point 6. The method of point 5, wherein the step of the first endpoint respectively sending the first and second versions of the image to the second endpoint comprises:

the first endpoint changing an input of the first communication channel from the video stream to the image to be sent, for sending the first version of the image to the second endpoint by using the first communication channel.

Point 7. The method of point 6, wherein the image to be sent is an image acquired by the imaging device in response to the request, or an image rendered based on an electronic file.

Point 8. The method of any of points 1-7, wherein the first endpoint comprises a video encoder;

wherein the step of the first endpoint sending a video stream acquired by the imaging device to a second endpoint of the plurality of endpoints for video communication comprises:

the video encoder generating the video stream based on video information acquired by the imaging device;

wherein the step of the first endpoint respectively generating a first version of the image and a second version of the image comprises:
the video encoder generating the first version of the image based on an image acquired by the imaging device in response to the request, or based on an electronic file.

Point 9. The method of any of points 1-8, wherein the first version of the image forms a last frame of the video stream.

Point 10. The method of any of points 1-9, comprising: the first endpoint continuing sending the first version of the image to the second endpoint, until the second endpoint receives the second version of the image.

Point 11. The method of any of points 1-10, wherein the step of the first endpoint respectively sending the first and second versions of the image to the second endpoint comprises:
the first endpoint establishing a second communication channel between the first and second endpoints for sending the second version of the image; and
the first endpoint sending the second version of the image to the second endpoint by using the second communication channel.

Point 12. The method of any of points 1-11, wherein the first endpoint comprises an image encoder;
wherein the step of the first endpoint respectively generating a first version of the image and a second version of the image comprises:
the image encoder generating the second version of the image based on an image acquired by the imaging device in response to the request, or based on an electronic file.

Point 13. The method of any of points 1-12, comprising: after receiving the second version of the image, the second endpoint replacing the received first version of the image with the received second version of the image.

Point 14. The method of any of points 1-13, comprising: after the second endpoint receives the second version of the image, the first endpoint resuming sending the video stream acquired by the imaging device to the second endpoint for video communication.

Point 15. The method of any of points 1-14, comprising: after the second endpoint receives the second version of the image, the second endpoint informing the first endpoint that the second version of the image is received; and/or
when the second endpoint fails to receive the second version of the image, the second endpoint informing the first endpoint that the second version of the image is not received.

Point 16. The method of any of points 1-15, comprising: the first endpoint sending any of the first and second versions of the image to another one or more of the plurality of endpoints excluding the first and second endpoints; or
the first endpoint sending any of the first and second versions of the image to each of the plurality of endpoints excluding the first endpoint.

Point 17. The method of any of points 1-16, wherein the step of the first endpoint respectively sending the first and second versions of the image to the second endpoint comprises:
the first endpoint sending information of the second version of the image to the second endpoint, prior to sending the second version of the image to the second endpoint;
in response to the information, the second endpoint sending a reply to the first endpoint indicating accepting or refusing to receive the second version of the image;
if the reply indicating accepting to receive the second version of the image, the first endpoint sending the second version of the image to the second endpoint.

Point 18. The method of any of points 1-17, wherein the at least one property comprises any of: compression grade, compression method, file size, resolution, number of pixels, number of colors, of an image.

Point 19. A communication method between a plurality of endpoints,
wherein a first endpoint of the plurality of endpoints comprises an imaging device,
the method comprising:
the first endpoint sending a video stream acquired by the imaging device to a second endpoint of the plurality of endpoints for video communication, by using a first communication channel between the first and second endpoints;
any of the plurality of endpoints initiating a request for pausing the video stream;
in response to said request, the imaging device acquiring an image;
the first endpoint respectively generating a first version of the image and a second version of the image;
wherein the first and second versions of the image depict one or more same objects;
wherein at least one property of the first version of the image is different from said at least one property of the second version of the image, such that a quality of the first version of the image is lower than a quality of the second version of the image;
the first endpoint respectively sending the first and second versions of the image to the second endpoint, comprising:
the first endpoint sending the first version of the image by using the first communication channel;
wherein the first version of the image forms a last frame of the video stream;
the first endpoint establishing a second communication channel between the first and second endpoints, and sending the second version of the image to the second endpoint by using the second communication channel;
the second endpoint receiving the first version of the image prior to receiving the second version of the image;
the first endpoint continuing sending the first version of the image, until the second endpoint receiving the second version of the image.

Point 20. A communication system comprising a plurality of endpoints, wherein a first endpoint of the plurality of endpoints comprises an imaging device;
wherein the first endpoint is configured to send a video stream acquired by the imaging device to a second endpoint of the plurality of endpoints for video communication, by using a first communication channel between the first and second endpoints;
wherein any of the plurality of endpoints is configured to initiate a request for requesting the first endpoint to send an image to the second endpoint, wherein the image is a still image;
wherein the first endpoint is configured to respectively generate a first version of the image and a second version of the image;

wherein the first and second versions of the image depict one or more same objects;

wherein at least one property of the first version of the image is different from said at least one property of the second version of the image, such that a quality of the first version of the image is lower than a quality of the second version of the image;

wherein the first endpoint is configured to respectively send the first and second versions of the image to the second endpoint; and the second endpoint is configured to receive the first version of the image prior to receiving the second version of the image.

The person skilled in the art realizes that the present invention by no means is limited to the examples described above. On the contrary, many modifications and variations are possible within the scope of the appended claims. For example, the communication channels may be of different types, and the endpoints may comprise additional devices, such as a display, a microphone, and/or a speaker. Such details are not considered to be an important part of the invention, which relates to the communication method between a plurality of endpoints and the communication system between a plurality of endpoints.

The invention claimed is:

1. A communication method between a plurality of endpoints, wherein a first endpoint of the plurality of endpoints comprises an imaging device, the method comprising:
   the first endpoint sending a video stream acquired by the imaging device to a second endpoint of the plurality of endpoints for video communication, by using a first communication channel between the first and second endpoints;
   any of the plurality of endpoints initiating a request for requesting the first endpoint to send an image to the second endpoint, wherein the image is a still image;
   the first endpoint respectively generating a first version of the image and a second version of the image;
   wherein the first and second versions of the image depict one or more same objects;
   wherein at least one property of the first version of the image is different from said at least one property of the second version of the image, such that a quality of the first version of the image is lower than a quality of the second version of the image;
   the first endpoint respectively sending the first and second versions of the image to the second endpoint; and
   the second endpoint receiving the first version of the image prior to receiving the second version of the image;
   the first endpoint sending information of the second version of the image to the second endpoint, prior to sending the second version of the image to the second endpoint;
   in response to the information, the second endpoint sending a reply to the first endpoint indicating accepting or refusing to receive the second version of the image;
   if the reply indicating accepting to receive the second version of the image, the first endpoint sending the second version of the image to the second endpoint.

2. The method of claim 1, wherein the step of the first endpoint respectively generating a first version of the image and a second version of the image comprises:
   in response to the request, the imaging device acquiring an image; and
   the first endpoint respectively generating the first and second versions of the image based on the acquired image.

3. The method of claim 2, wherein the step of the imaging device acquiring an image comprises:
   the imaging device acquiring the image by using a focal length being different from a focal length used for acquiring the video stream.

4. The method of claim 1, wherein the step of the first endpoint respectively generating a first version of the image and a second version of the image comprises:
   in response to the request, the first endpoint generating the first and second versions of the image based on an electronic file.

5. The method of claim 1, wherein the step of the first endpoint respectively sending the first and second versions of the image to the second endpoint comprises:
   the first endpoint sending the first version of the image by using the first communication channel.

6. The method of claim 5, wherein the step of the first endpoint respectively sending the first and second versions of the image to the second endpoint comprises:
   the first endpoint changing an input of the first communication channel from the video stream to the image to be sent, for sending the first version of the image to the second endpoint by using the first communication channel.

7. The method of claim 6, wherein the image to be sent is an image acquired by the imaging device in response to the request, or an image rendered based on an electronic file.

8. The method of claim 1, wherein the first endpoint comprises a video encoder;
   wherein the step of the first endpoint sending a video stream acquired by the imaging device to a second endpoint of the plurality of endpoints for video communication comprises:
   the video encoder generating the video stream based on video information acquired by the imaging device;
   wherein the step of the first endpoint respectively generating a first version of the image and a second version of the image comprises:
   the video encoder generating the first version of the image based on an image acquired by the imaging device in response to the request, or based on an electronic file.

9. The method of claim 1, wherein the first version of the image forms a last frame of the video stream.

10. The method of claim 1, comprising:
    the first endpoint continuing sending the first version of the image to the second endpoint, until the second endpoint receives the second version of the image.

11. The method of claim 1, wherein the step of the first endpoint respectively sending the first and second versions of the image to the second endpoint comprises:
    the first endpoint establishing a second communication channel between the first and second endpoints for sending the second version of the image; and
    the first endpoint sending the second version of the image to the second endpoint by using the second communication channel.

12. The method of claim 1, wherein the first endpoint comprises an image encoder;
    wherein the step of the first endpoint respectively generating a first version of the image and a second version of the image comprises:

the image encoder generating the second version of the image based on an image acquired by the imaging device in response to the request, or based on an electronic file.

13. The method of claim 1, comprising:
after receiving the second version of the image, the second endpoint replacing the received first version of the image with the received second version of the image.

14. The method of claim 1, comprising:
after the second endpoint receiving the second version of the image, the first endpoint resuming sending the video stream acquired by the imaging device to the second endpoint for video communication.

15. The method of claim 1, comprising:
after the second endpoint receiving the second version of the image, the second endpoint informing the first endpoint that the second version of the image is received; and/or
when the second endpoint fails to receive the second version of the image, the second endpoint informing the first endpoint that the second version of the image is not received.

16. The method of claim 1, comprising:
the first endpoint sending any of the first and second versions of the image to another one or more of the plurality of endpoints excluding the first and second endpoints; or
the first endpoint sending any of the first and second versions of the image to each of the plurality of endpoints excluding the first endpoint.

17. The method of claim 1, wherein the at least one property comprises any of: compression grade, compression method, file size, resolution, number of pixels, number of colors, of an image.

18. A communication method between a plurality of endpoints, wherein a first endpoint of the plurality of endpoints comprises an imaging device, the method comprising:
the first endpoint sending a video stream acquired by the imaging device to a second endpoint of the plurality of endpoints for video communication, by using a first communication channel between the first and second endpoints;
any of the plurality of endpoints initiating a request for pausing the video stream;
in response to said request, the imaging device acquiring an image;
the first endpoint respectively generating a first version of the image and a second version of the image;
wherein the first and second versions of the image depict one or more same objects;
wherein at least one property of the first version of the image is different from said at least one property of the second version of the image, such that a quality of the first version of the image is lower than a quality of the second version of the image;
the first endpoint respectively sending the first and second versions of the image to the second endpoint, comprising:
the first endpoint sending the first version of the image by using the first communication channel;
wherein the first version of the image forms a last frame of the video stream;
the first endpoint establishing a second communication channel between the first and second endpoints, and sending the second version of the image to the second endpoint by using the second communication channel;
the second endpoint receiving the first version of the image prior to receiving the second version of the image;
the first endpoint continuing sending the first version of the image, until the second endpoint receiving the second version of the image;
the first endpoint sending information of the second version of the image to the second endpoint, prior to sending the second version of the image to the second endpoint;
in response to the information, the second endpoint sending a reply to the first endpoint indicating accepting or refusing to receive the second version of the image;
if the reply indicating accepting to receive the second version of the image, the first endpoint sending the second version of the image to the second endpoint.

19. A communication system comprising a plurality of endpoints,
wherein a first endpoint of the plurality of endpoints comprises an imaging device;
wherein the first endpoint is configured to send a video stream acquired by the imaging device to a second endpoint of the plurality of endpoints for video communication, by using a first communication channel between the first and second endpoints;
wherein any of the plurality of endpoints is configured to initiate a request for requesting the first endpoint to send an image to the second endpoint,
wherein the image is a still image; wherein the first endpoint is configured to respectively generate a first version of the image and a second version of the image;
wherein the first and second versions of the image depict one or more same objects;
wherein at least one property of the first version of the image is different from said at least one property of the second version of the image, such that a quality of the first version of the image is lower than a quality of the second version of the image;
wherein the first endpoint is configured to respectively send the first and second versions of the image to the second endpoint; and
the second endpoint is configured to receive the first version of the image prior to receiving the second version of the image;
the first endpoint sending information of the second version of the image to the second endpoint, prior to sending the second version of the image to the second endpoint;
in response to the information, the second endpoint sending a reply to the first endpoint indicating accepting or refusing to receive the second version of the image;
if the reply indicating accepting to receive the second version of the image, the first endpoint sending the second version of the image to the second endpoint.

* * * * *